UNITED STATES PATENT OFFICE.

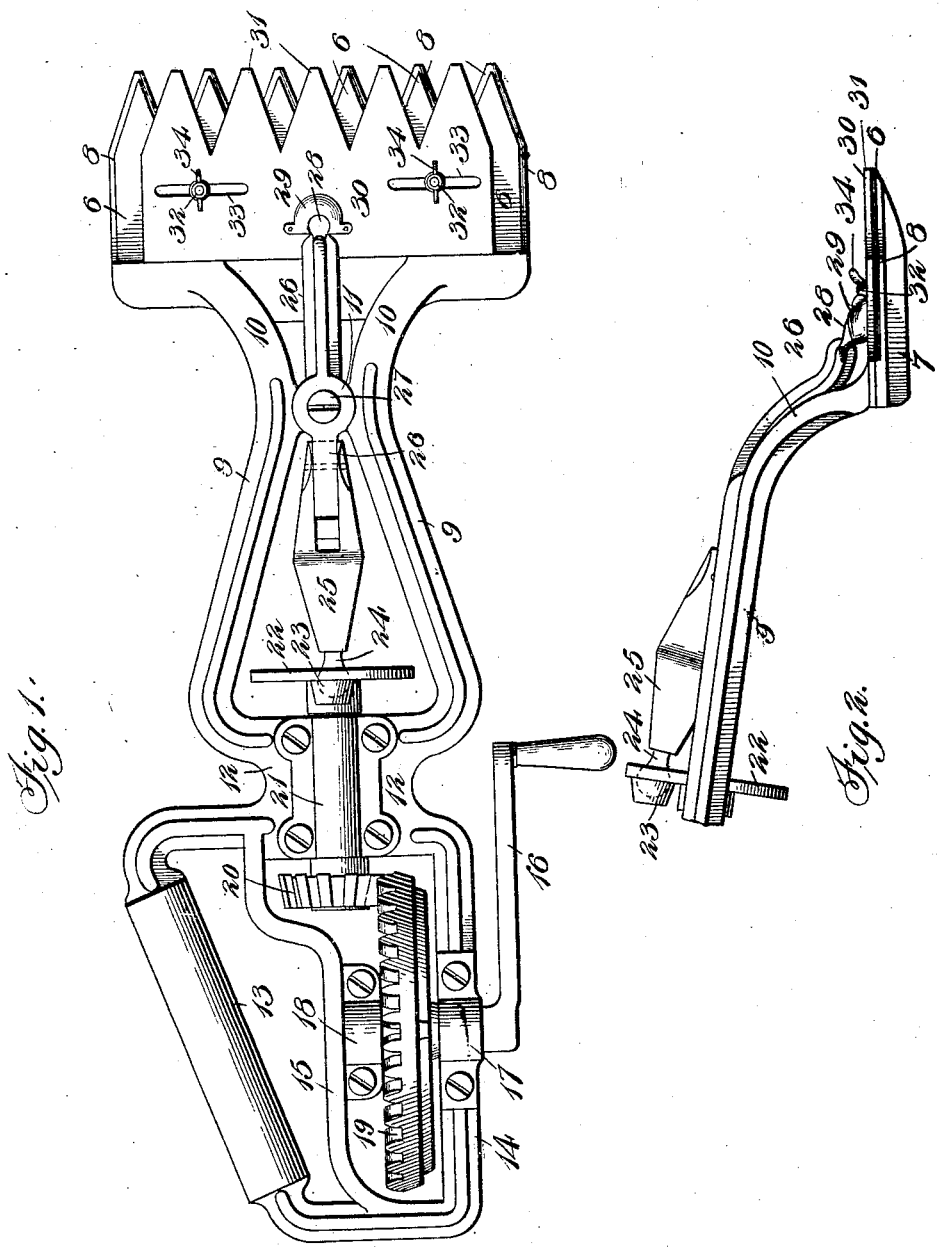

JOHN H. SEIP, OF PECKVILLE, PENNSYLVANIA.

LAWN-MOWER.

No. 832,169.

Specification of Letters Patent.

Patented Oct. 2, 1906.

Application filed January 27, 1906. Serial No. 298,213.

*To all whom it may concern:*

Be it known that I, JOHN H. SEIP, a citizen of the United States, residing at Peckville, in the county of Lackawanna and State of Pennsylvania, have invented new and useful Improvements in Lawn-Mowers, of which the following is a specification.

This invention is a lawn-mower or trimmer designed particularly to trim along shrubbery, along fences, or on steep terraces where an ordinary lawn-mower cannot be used with good effect or for cutting grass which is too high for an ordinary mower.

It is designed to supersede the lawn-shears ordinarily used for the purposes referred to.

The invention is illustrated in the accompanying drawings, in which—

Figure 1 is a plan view of the machine. Fig. 2 is a side elevation partly broken away.

Referring specifically to the drawings, the frame which supports the moving parts is preferably cast in substantially a single piece and is of novel and advantageous form and construction. It has a finger-bar or row of fingers 6, on the under side of which are ribs 7, on which the machine slides when in use. The central portion of the top of the finger-bars is depressed, producing a rim 8 around the outer edge of each. This decreases the friction of the cutter-bar and assists in the cutting action. The finger-bar is connected to two branches 9 of the frame, these branches being offset upwardly, as at 10, so as to bring the handle of the device at a suitable height for convenient operation. The branches are connected by a cross-piece 11, forming a support for the pivot of the lever which operates the cutter-bar, and the branches unite at their upper ends to form a neck 12, from which extends a handle portion 13 at the left side of the machine, a branch 14 at the right side, and an intermediate branch 15, these parts being all in substantially the same plane.

An operating-crank is indicated at 16, and its shaft is held in bearings under the caps 17 and 18 on the branches 14 and 15, respectively. Between the bearings the shaft carries a crown-gear 19, which meshes with a pinion 20, whose shaft finds a bearing in the neck 12 under a cap 21. This shaft carries at its lower end a crank-disk 22, which has a socket 23, in which fits the ball-head 24 of the tumbling-rod 25, which oscillates between the branches 9. At the end opposite the head the tumbling-rod is forked and is pivotally connected between the forks to one arm of a lever 26, which is fulcrumed on a pin 27 at the cross-piece 11. The other arm of the lever is curved down and has at its end a ball 28, which fits in a socket 29 on the top of the cutter-bar 30, which is provided with teeth 31, corresponding to the fingers of the finger-bar. The cutter-bar is held in position on the finger-bar by means of studs 32, which extend through slots 33 in said bar to allow for the reciprocation of the cutter. These studs are provided with thumb-screws 34.

In operation the motion of the crank is communicated to the cutter-bar in an obvious manner, producing the reciprocation of the latter. The handle is advantageously disposed to guide and move the device and to hold it steady while the crank is being turned, the pressure of the hands on the handle and crank being opposed, so that the device is quite firmly held therebetween and there is no extraordinary strain on either arm. The pressure of the cutter-bar on the finger-bar may be adjusted by the thumb-screws 34.

I claim—

1. The combination with a frame having a finger-bar and a pair of branches extending rearwardly therefrom, said branches having a cross connection therebetween, of a reciprocating cutter-bar on the finger-bar, having a socket in the top, a lever pivoted on the cross-connection between the branches and having a head fitting in the socket, a hand-crank and crank-disk mounted on the frame and having gearing therebetween, and a tumbling-rod located between said branches and connecting the crank-disk and the lever.

2. The combination with a frame comprising a finger-bar, branches extending rearwardly therefrom and united at a neck, a handle connected to and offset on one side of the neck, a bearing-frame offset on the other side from the neck, a crank-shaft and gear mounted on said frame, a shaft mounted on a bearing on the neck and having at one end a pinion meshing with the gear and at the other end a crank-disk, a cutter-bar on the finger-bar, a lever pivoted between said branches and engaging the cutter-bar, and a tumbling-rod connecting the lever and crank-disk and oscillating between said branches.

In testimony whereof I have signed my name to this specification in the presence of two subscribing witnesses.

JOHN H. SEIP.

Witnesses:
CHARLES J. SEIP,
JOHN D. DAY.